United States Patent [19]

Capps, Jr. et al.

[11] Patent Number: 5,177,747
[45] Date of Patent: Jan. 5, 1993

[54] PERSONAL COMPUTER MEMORY BANK PARITY ERROR INDICATOR

[75] Inventors: Louis B. Capps, Jr., Boynton Beach; Jimmy G. Foster; Warren E. Price, both of Boca Raton; Robert W. Rupe, Delray Beach; Kenneth A. Uplinger, Boca Raton, all of Fla.

[73] Assignee: International Business Machines Corp., Armonk, N.Y.

[21] Appl. No.: 833,563

[22] Filed: Feb. 7, 1992

Related U.S. Application Data

[63] Continuation of Ser. No. 422,204, Oct. 16, 1989, abandoned.

[51] Int. Cl.[5] .............................................. G06F 11/10
[52] U.S. Cl. .................................. 371/51.1; 371/21.6
[58] Field of Search ...................... 371/51.1, 21.6, 21.1, 371/40.1, 49.7

[56] References Cited

U.S. PATENT DOCUMENTS

| | | | |
|---|---|---|---|
| 3,806,716 | 4/1974 | Lahti et al. | 371/51.1 |
| 3,814,922 | 6/1974 | Nibby et al. | 371/40.1 |
| 3,815,103 | 6/1974 | Holtey et al. | 371/51.1 |
| 3,831,148 | 8/1974 | Greenwald et al. | 371/21.6 |
| 4,037,091 | 7/1977 | Beuscher | 371/51.1 |
| 4,535,455 | 8/1985 | Peterson | 371/21.6 |
| 4,621,364 | 11/1986 | Tschoepe | 371/21.6 |
| 4,774,712 | 9/1988 | Lewis | 371/51.1 |
| 4,809,276 | 2/1989 | Lemay | 371/38 |
| 4,849,977 | 7/1989 | Baun, Jr. et al. | 371/49.1 |
| 4,918,693 | 4/1990 | Ardini, Jr. et al. | 371/21.6 |
| 4,920,536 | 4/1990 | Hammond et al. | 371/51.1 |
| 4,928,281 | 5/1990 | Kurosawa et al. | 371/51.1 |
| 4,962,501 | 10/1990 | Byers et al. | 371/51.1 |

FOREIGN PATENT DOCUMENTS 56-19593 2/1981 Japan.

OTHER PUBLICATIONS

Anello et al, "Storage Address Checking" IBM Technical Disclosure Bulletin, vol. 12, No. 11 Apr. 1970.
P. Favre, "Microcode Integrity Checking", IBM TDB vol. 20, No. 11B, pp. 4838-4839.

Primary Examiner—Robert W. Beausoliel
Assistant Examiner—Phung My Chung
Attorney, Agent, or Firm—George E. Grosser; Douglas R. McKechnie

[57] ABSTRACT

A personal computer has two memory banks respectively connected to two parity check units operative to detect parity errors. Upon doing so, each unit feeds a parity error signal to a separate latch. The latches are connected to a logic circuit which is in turn connected to an interrupt controller that initiates an interrupt when a parity error occurs. One latch is further connected to a check bit of a register of an I/O port and the check bit is set by the one latch. An interrupt handler reads the register and provides messages indicating which memory bank caused the parity error.

5 Claims, 1 Drawing Sheet

PERSONAL COMPUTER MEMORY BANK PARITY ERROR INDICATOR

This is a continuation of application Ser. No. 07/422,204, filed Oct. 16, 1989, now abandoned.

FIELD OF THE INVENTION

This invention relates to the field of data processing and more particularly, to improvements in parity error indicators useful to indicate the bank from which a parity error arose in a personal computer having a banked memory.

BACKGROUND OF THE INVENTION

Parity checking is a well known method for detecting errors in transmitting data. In accordance with such method, a parity bit is or is not added to a packet, e.g. a byte, of binary digits so as to maintain the total number of bits, including the parity bit, as an odd or an even sum. When the packet is transmitted, the total number of bits is counted and if the sum is not odd or even as it is supposed to be, a parity error has occurred. Current high performance personal computers have thirty two bit wide memory data paths in which data is arranged in four eight bit bytes each byte being associated with one parity bit. A parity checking circuit is connected to a data path and upon detecting a parity error, it sends a signal that latches up a flip flop which generates a parity check signal. The parity check signal in turn causes a hardware interrupt to be sent to a processor and a software interrupt handling routine analyzes the error, displays an error code on a display, and halts operation of the computer.

To improve system performance, the memory may be arranged as a sixty four bit banked memory wherein data is stored in memory in odd/even double words of thirty two bits each. On each memory access, parity is read and checked sixty four bits at a time and an error cannot be isolated to a particular memory bank, module, or field replaceable module. It is desirable to be able to isolate the error to the bank from which the error arose.

The prior art of which we are aware recognizes the problem but provides solutions that are more complicated and more costly than the solution provided by our invention. In the prior art, a parity check circuit is associated with each bank of memory along with some additional hardware that is also associated with each bank. Examples of such prior art are the following. IBM Technical Disclosure bulletin Vol. 20, No. 11B, April 1978, pages 4839 and 4834 disclose "Microcode Integrity Checking" in which a plurality of modules respectively feed parity check circuits and counters. The modules store count fields, in addition to the data and parity bits. Single bit errors are detected by the parity check and double bit errors are detected by the counters. The article suggests it is "easy to determine which module has failed" but fails to describe precisely how it is done.

JP 56-19593 briefly describes a "Parity Check Processing System for Memory" in which two parity check circuits from two memory banks feed a status display register. The result from the check circuits is "respectively reported separately on the status display register", and a processor can then take some action based on the content of the register. The details of the separate reporting are not disclosed.

U.S. Pat. No. 4,809,276 - R. A. LEMAY et al discloses a "Memory Failure Detection Apparatus" having banks of memory and error detection and correction circuits associated with each bank. A counter is also associated with each bank and records the number of corrections that have occurred. A processor periodically polls the counters and provides messages to replace memory boards.

SUMMARY OF THE INVENTION

One of the objects of the invention is to provide a simple, low cost parity checking for a banked memory system in which the bank in which an error occurs can be readily identified.

Another object is to provide a simple, low cost parity check for a two bank memory system that eliminates the need for duplicate hardware to be associated with each bank in order to provide an indication of which bank produced a parity error.

Briefly, in accordance with the invention, a memory has two banks connected respectively to two parity check circuits which cause an interrupt when a parity error occurs. One circuit is further operative to set a check bit in a register. When an interrupt occurs, an interrupt handling routine determines the status of the check bit and provides a message indicating which bank caused the error.

DRAWING

Other objects and advantages of the invention will be apparent from the following description taken in connection with the accompanying drawing wherein:

FIG. 1 is a block diagram of a personal computer embodying the invention; and

FIG. 1 is a flow diagram of functional steps carried out by the computer shown in FIG. 1.

DETAILED DESCRIPTION

Figure 1:
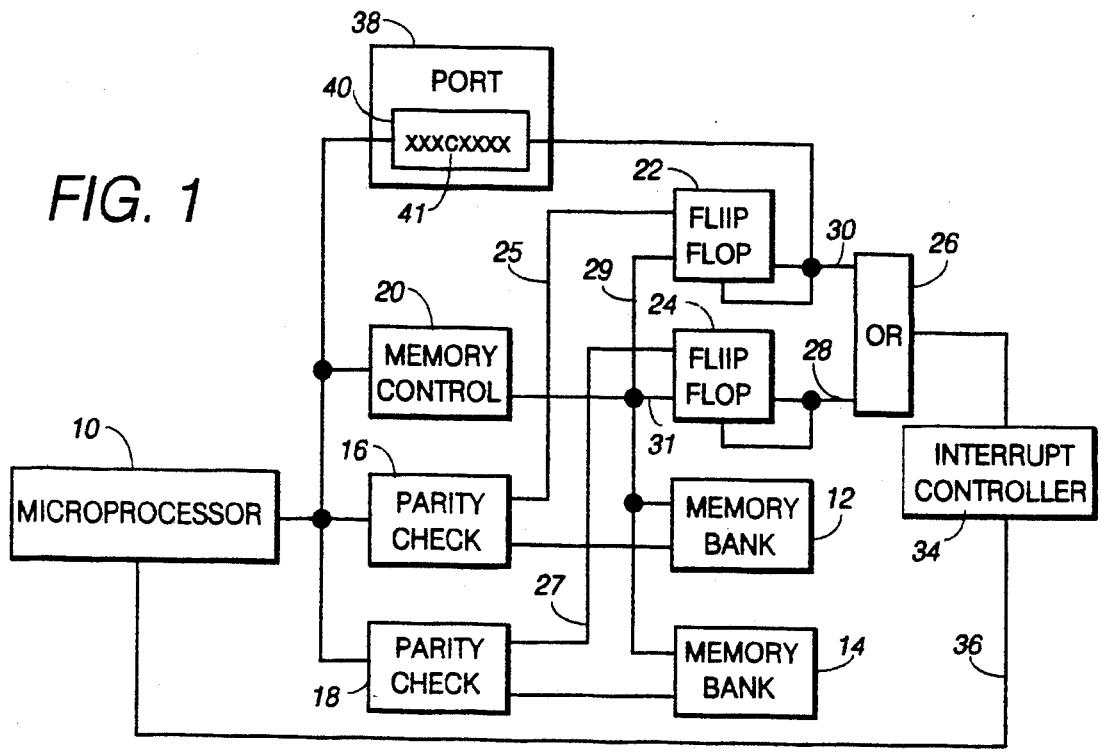

Referring now to the drawing, a personal computer includes a microprocessor 10 connected to a main memory comprised of two memory banks 12 and 14 through two parity check units 16 and 18. A memory control 20 is connected to the microprocessor and to the memory banks for controlling operation of the main memory. The parity check units work in conventional fashion and are operative to generate parity error signals when parity errors are detected thereby. During each main memory access, data is simultaneously read from or written into both banks 16 and 18. If there is a parity error in the data being accessed for bank 12, parity check unit 16 will produce a first parity error signal. If there is a parity error in the data being accessed for bank 14, parity check unit 18 will produce a second parity error signal.

Two latches or flip flops 22 and 24 have output lines 28 and 30 connected to the inputs of a two input OR circuit or logic unit 26. The output lines are also respectively connected back to the clear inputs of the latches to latch up the output signals, when they arise. Latches 22 and 24 further have input lines 25 and 27 respectively connected to outputs from parity check units 16 and 18. The latches further have input lines 29 and 31 connected to memory control 20 to receive a clock signal from the address strobe line thereof. When either parity check unit detects a parity error, during a memory access, a parity error signal is sent over its respective output line 25 or 27 to the appropriate one of latches 22 and 24 and upon receiving the next clock signal, such latch is set and produces an active output signal. The active output from the set latch then switches OR circuit 26 to send a parity error signal to an interrupt controller 34. This controller is connected by line 36 to an interrupt input of microprocessor 10 to initiate an interrupt in response to receiving a parity error signal from unit 26.

Output 30 from latch 22 is also connected to an input of a single bit position 41 of a register 40 of an addressable I/O port 38. An active signal from latch 22 sets bit position 41 (also referred to herein as a check bit) in response to a parity error signal arising from memory bank 12.

Figure 2:
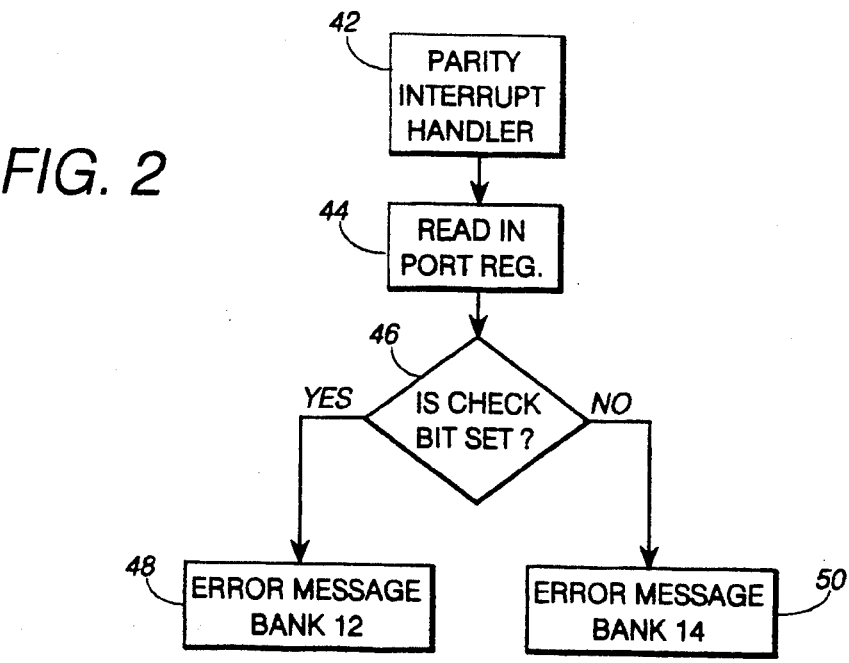

The personal computer also includes a conventional interrupt handler that is modified in an obvious manner to provide the functions shown in FIG. 2. When the microprocessor initiates an interrupt, the interrupt handling routine first determines the interrupt is caused by a parity error and branches into a parity interrupt handler 42. This first causes in step or function 44 the contents of I/O port 38 register 40 to be read into the microprocessor. Step 46 then determines whether or not the check bit of register 40 has been set. If it has, then a message is generated in step 48 indicating that a parity error occurred in memory bank 12. Otherwise, a message is generated in step 50 indicating the error arose in memory bank 14. The error messages can then be used to service or replace the failing memory bank. It should also be noted that in the unlikely event parity errors occur in both banks, the resultant message would only indicate the error came from bank 12. After such bank has been fixed, and upon further testing of the computer, the other bank should reproduce the error and it can be replaced after the error message has been outputted.

The principal advantage of the invention is the simplicity of the solution to the problem of identifying the memory bank from which a parity error arises. It should be apparent to those skilled in the art that changes can be made in the details of parts without departing from the scope of the invention as defined in the appended claims.

What is claimed is:

1. In a personal computer having an interruptable microprocessor, and a main memory comprising first and second memory banks which are simultaneously accessed during each memory access, a memory bank parity error indicating system for indicating which memory bank caused a parity error during a memory access, comprising:

first and second parity check units respectively connected to said first and second memory banks, said first parity check unit being operative to generate a first parity error signal upon detecting a parity error in data being accessed in said first memory bank, said second parity check unit being operative to generate a second parity error signal upon detecting a parity error in data being accessed in said second memory bank;

first means connected to said first and second parity check units and to said microprocessor, said first means being operative in response to either of said parity check units generating a parity error signal to transmit a parity error interrupt signal to said microprocessor;

a single bit storage device for storing a check bit for indicating which one of said first and second memory banks was being accessed during a single memory access in which a parity error occurs, said check bit being switchable between a first state and a second state;

second means connected between said first parity check unit and said storage device for switching said check bit from said second state to said first state only in response to said first parity check unit generating said first parity error signal;

and parity error interrupt handling means connected to said storage device and being operative in response to said microprocessor receiving said parity error interrupt signal to read said check bit and determine from said state of said check bit which one of said first and second memory banks caused the parity error during said memory access, said parity error interrupt handling means determining said first memory bank caused the parity error when said check bit is in said first state and determining said second memory bank caused the parity error when said check bit is in said second state.

2. A personal computer in accordance with claim 1 wherein said parity error interrupt handling means generates a first message when said check bit is in said first state indicating that said first memory bank caused a parity error and generates a second message when said check bit is in said second state indicating that said second memory bank caused a parity error.

3. A personal computer in accordance with claim 2 wherein said first means comprises:

first and second latches respectively connected to said first and second parity check units for respectively receiving said first and second parity error signals and generating in response thereto respective output signals, said first latch being set in response to generation of said first parity error signal, and said second latch being set in response to generation of said second parity error signal;

an OR logic circuit connected to outputs of said first and second latches and being operative in response to receiving one of said output signals from either one of said latches to generate a parity check signal;

and an interrupt controller having an input connected to receive said parity check signal from said OR logic circuit, said interrupt controller being further connected to said microprocessor to initiate a parity error interrupt in response to receiving said parity check signal.

4. A system in accordance with claim 3, wherein second means includes said first latch and a connection from said first latch to said storage device whereby said check bit is switched from said second state to said first state in response to said first latch being set by said first parity error signal.

5. A personal computer in accordance with claim 1 comprising:

an addressable I/O port having a register, said storage device being part of said register;

and said microprocessor being connected to said I/O port for accessing said register and reading said check bit to determine the state of said check bit.

* * * * *